United States Patent
Schank

(10) Patent No.: US 11,001,384 B2
(45) Date of Patent: May 11, 2021

(54) HYBRID POWER SYSTEMS FOR AIRCRAFT

(71) Applicant: Bell Helicopter Textron Inc., Fort Worth, TX (US)

(72) Inventor: Troy C. Schank, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 370 days.

(21) Appl. No.: 15/722,672

(22) Filed: Oct. 2, 2017

(65) Prior Publication Data

US 2019/0100322 A1 Apr. 4, 2019

(51) Int. Cl.

| | |
|---|---|
| *B64D 27/10* | (2006.01) |
| *B64D 27/24* | (2006.01) |
| *B64D 41/00* | (2006.01) |
| *B64C 29/00* | (2006.01) |
| *F02C 6/14* | (2006.01) |
| *B64C 27/28* | (2006.01) |
| *B64D 37/30* | (2006.01) |
| *B64D 27/02* | (2006.01) |

(52) U.S. Cl.
CPC ............ *B64D 27/10* (2013.01); *B64C 27/28* (2013.01); *B64C 29/0016* (2013.01); *B64C 29/0083* (2013.01); *B64D 27/24* (2013.01); *B64D 37/30* (2013.01); *B64D 41/00* (2013.01); *F02C 6/14* (2013.01); *B64D 2027/026* (2013.01)

(58) Field of Classification Search
CPC ........ B64D 27/10; B64D 27/24; B64D 41/00; B64D 2027/026; B64D 37/30; B64C 27/28; B64C 29/0016; B64C 29/0083; F02C 6/14
See application file for complete search history.

(56) References Cited

U.S. PATENT DOCUMENTS

| | | | |
|---|---|---|---|
| 4,628,010 A | 12/1986 | Iwanciow | |
| H1234 H * | 10/1993 | Burgner | 60/246 |
| 8,939,399 B2 | 1/2015 | Kouros et al. | |
| 9,162,771 B2 | 10/2015 | Roggemans et al. | |
| 9,218,693 B2 | 12/2015 | Hale et al. | |
| 9,303,961 B1 | 4/2016 | Frericks et al. | |

(Continued)

FOREIGN PATENT DOCUMENTS

| | | |
|---|---|---|
| CN | 109592028 A | 4/2019 |
| EP | 3461742 A1 | 4/2019 |

(Continued)

OTHER PUBLICATIONS

Translation of FR 3019588 dated Oct. 2015.*

(Continued)

*Primary Examiner* — Assres H Woldemaryam
*Assistant Examiner* — Aaron M Rodziwicz
(74) *Attorney, Agent, or Firm* — Timmer Law Group, PLLC

(57) ABSTRACT

A hybrid power system for a vertical takeoff and landing ("VTOL") aircraft including a first power source operable to provide a power output for at least a forward flight mode; and a second power source configured to provide a high specific power output for an altitude adjustment flight mode, the second power source including an auxiliary gas generator coupled to a turbine and a drive system. In other aspects, there is provided a VTOL aircraft and methods for providing power to a VTOL aircraft.

13 Claims, 8 Drawing Sheets

(56) References Cited

U.S. PATENT DOCUMENTS

| | | | |
|---|---|---|---|
| 9,522,730 B2 | 12/2016 | Smith et al. | |
| 9,586,691 B2 | 3/2017 | Rossotto et al. | |
| 9,739,206 B2 | 8/2017 | Houston et al. | |
| 2016/0290223 A1* | 10/2016 | Mills | F02B 51/02 |
| 2017/0114723 A1 | 4/2017 | Marconi et al. | |
| 2017/0217596 A1* | 8/2017 | Bacon | B64D 27/00 |

FOREIGN PATENT DOCUMENTS

| | | | |
|---|---|---|---|
| EP | 3461742 B1 | 12/2019 | |
| FR | 3019588 A1 * | 10/2015 | F02C 7/36 |
| FR | 3019588 A1 | 10/2015 | |
| GB | 1414232 A | 11/1975 | |

OTHER PUBLICATIONS

Sutton et al., Gas Generator Propellants; Thiokol Chemical Corporation; pp. 65-72.
CGG Safety & Systems; Cool Gas Generators for space applications; Mar. 11, 2014.
Solved Problem 6.10—The General Electric T700 Gas Turbine Engine; updated Jul. 22, 2014; www.ohio.edu/mechanical/thermo/Intro/Chapt.1_6/gasturbine/.
EP Search Report, dated May 28, 2018, by the EPO, re EP Patent App No. 17198170.7.
EP Exam Report, dated Jun. 15, 2018, by the EPO, re EP Patent App No. 17198170.7.
EP Exam Report, dated Jan. 3, 2019, by the EPO, re EP Patent App No. 17198170.7.
EP Decision to Grant, dated Nov. 7, 2019, by the EPO, re EP Patent App No. 17198170.7.
Communication under Rule 71(3) EPC—Intention to Grant, dated Aug. 2, 2019, by the EPO, re EP Patent App No. 17198170.7.

* cited by examiner

HYBRID POWER SYSTEMS FOR AIRCRAFT

BACKGROUND

Technical Field

The present disclosure relates to aircraft and, more particularly, to aircraft power systems, components thereof, and features and methods relating thereto.

Description of Related Art

Traditional aircraft, including vertical takeoff and landing ("VTOL") aircraft, have typically included one or more traditional power systems of the same type (e.g., a combustion engine). Aircraft that have one power system of the same type often encounter instances in which increased power from additional power systems of the same type may be desirable. In aircraft that include more than one engine of the same type, one or more engines are often deactivated or reduced in use during forward flight, which can lead to weight inefficiencies (e.g., additional weight of one or more engines while such engines remain deactivated or reduced in use during forward flight) and fuel inefficiencies (e.g., additional fuel use for one or more engines that do not provide meaningful power to the aircraft during forward flight).

Some VTOL aircraft have relatively small diameter propellers, which results in high disk loading, for vertical flight and then transition to efficient wing lift in forward flight. For example, a VTOL aircraft may require two to five times the power in hover mode than is required in forward flight. If a conventional turbine engine is sized to provide power in hover, the engine is much larger and heavier than required in forward flights, which reduces available payload. A conventional turbine engine sized for peak power in hover mode operates at a small fraction of the maximum during forward flight, which reduces efficiency and can cause high specific fuel consumption. Accordingly, traditional power systems are often inefficient for VTOL aircraft because, if a power system is sized to provide sufficient power during takeoff, landing, and hovering, it is often unnecessarily large and heavy for forward flight, during which lower amounts of power are typically required.

Some aircraft have included hybrid power systems that attempt to combine traditional power systems, such as a thermal engine, with chemical or electrical power system. However, chemical and electrical power systems often do not provide sufficient specific power for certain functions and maneuvers, such as during takeoff, landing, and hovering. Furthermore, such hybrid systems do not provide sufficient specific power (or power density) to provide a pilot with sufficient time to safely account for failure of another power system.

Propulsion systems for rockets provide a very high power source. However, the direct use of hot gasses in conventional rocket propulsion systems creates problems such as noise, flame and heat damage, and lack of adequate throttle control, etc. Accordingly, conventional rocket propulsion systems have a high specific power, but are not directly useful for VTOL aircraft.

There is a need for a hybrid power system with sufficiently high specific energy to provide a high specific power output for certain functions (e.g., takeoff, landing, hovering, and failure of other power systems), while remaining lightweight and compact so as to reduce fuel and weight inefficiencies.

SUMMARY

In a first aspect, there is provided a hybrid power system for a vertical takeoff and landing aircraft including a first power source operable to provide a power output for at least a forward flight mode; and a second power source configured to provide a high specific power output for an altitude adjustment flight mode, the second power source including an auxiliary gas generator coupled to a turbine and a drive system.

In an embodiment, the auxiliary gas generator includes at least one of the following: a combustion gas generator, a decomposition gas generator, a cool gas generator.

In another embodiment, the altitude adjustment flight mode includes at least one of the following: a hover mode, a transition mode, and an engine failure mode.

In still another embodiment, the auxiliary gas generator includes a plurality of gas generator cartridges; and a plenum chamber disposed between the turbine and the plurality of gas generator cartridges, the plenum chamber in fluid communication with the turbine and the plurality of gas generator cartridges; wherein the auxiliary gas generator is configured such that each of the plurality of gas generator cartridges can be activated independently to release gas into the plenum chamber to control power output of the turbine.

In yet another embodiment, the auxiliary gas generator includes a combustion gas generator configured to use solid propellant as a fuel.

In an embodiment, the solid propellant includes a solid fuel, an oxidizer, and a cooling agent.

In one embodiment, the drive system includes at least one of the following: an electric system, a hydraulic pump system, and a mechanical drive system.

In another embodiment, the auxiliary gas generator is a decomposition gas generator arranged to use at least one of the following: a liquid decomposition material and a solid decomposition material.

In another embodiment, the liquid decomposition material includes high purity hydrogen peroxide.

In still another embodiment, the solid decomposition material includes at least one of sodium azide and nitroguanidine.

In an embodiment, the auxiliary gas generator includes a cool gas generator.

In another embodiment, the cool gas generator includes an oxidizing chamber; a fuel chamber; and a combustion chamber in fluid communication with the oxidizing chamber and the fuel chamber to enable contents of the oxidizing chamber and the fuel chamber to be released into the combustion chamber.

In one embodiment, the cool gas generator is configured to permit control of an inlet temperature at the turbine by controlling the rate at which the contents of the oxidizing chamber and the fuel chamber are released into the combustion chamber.

In yet another embodiment, the cool gas generator includes an oxidizer plenum chamber in fluid communication with a plurality of oxidizer cartridges; a fuel plenum chamber in fluid communication with a plurality of fuel cartridges; and a combustion chamber in fluid communication with the oxidizing plenum chamber and the fuel plenum chamber to enable contents of the oxidizing plenum chamber and the fuel plenum chamber to be released into the combustion chamber; wherein the cool gas generator is configured such that each of the cartridges in the plurality of oxidizer cartridges and the plurality of fuel cartridges can be activated independently to release contents therein into the oxidizer plenum and fuel plenum, respectively.

In a second aspect, there is provided a vertical takeoff and landing aircraft including a fuselage; a wing extending from the fuselage; a rotor assembly extending from the wing; and a hybrid power system including a first power source coupled to the rotor assembly by a drive system; and a second power source coupled to the rotor assembly by the drive system including an auxiliary gas generator configured to provide a high specific power output; and a turbine configured to be in communication with the auxiliary gas generator; wherein the hybrid power system is configured such that the second power source is activated during an altitude adjustment flight mode.

In an embodiment, the altitude adjustment flight mode includes at least one of the following: a hover mode, a transition mode, and an engine failure mode.

In one embodiment, the auxiliary gas generator includes at least one of the following: a combustion gas generator, a decomposition gas generator, and a cool gas generator.

In yet another embodiment, the second power source includes a specific power of greater than 50 Watts/kilogram and a specific energy from 5 Watt-hours/kilogram to 50 Watt-hours/kilogram.

In a third aspect, there is provided a method for providing power to a vertical takeoff and landing aircraft including providing a first power source; providing a second power source including an auxiliary gas generator and a turbine in communication with the auxiliary gas generator; providing a rotor assembly; powering the rotor assembly using the first power source to provide lift to the aircraft; and activating the second power source to power the rotor assembly when the aircraft is in an altitude adjustment flight mode.

In an embodiment, the auxiliary gas generator includes at least one of the following: a combustion gas generator, a decomposition gas generator, and a cool gas generator Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the hybrid power systems and methods therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

Figure 1:
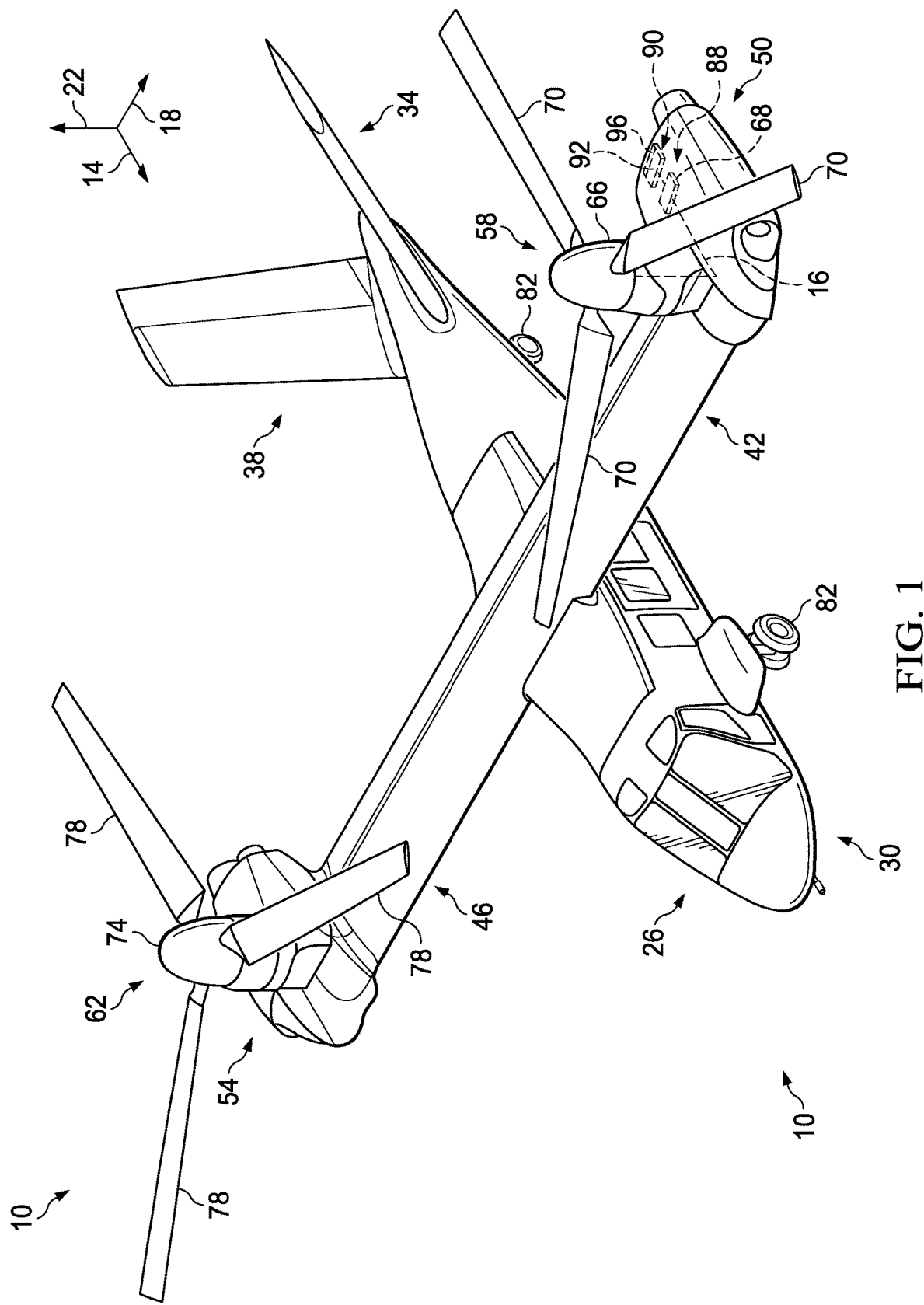
FIG. 1 is a perspective view of a tiltrotor aircraft in helicopter mode, according to one example embodiment.
Figure 2:
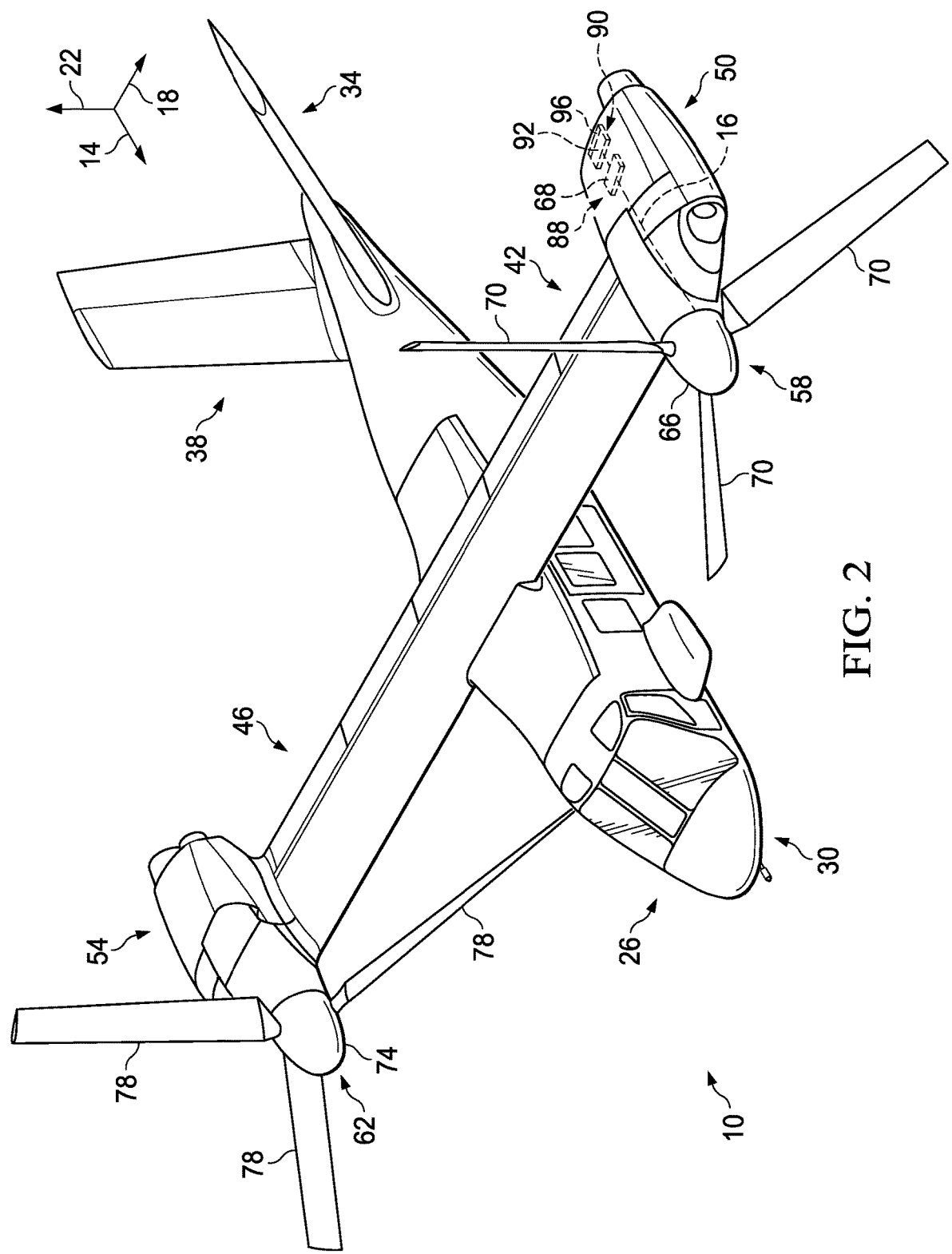
FIG. 2 is another perspective view of a tiltrotor aircraft in airplane mode, according to one example embodiment.

FIGS. 1-2 depict aircraft 10, which is a VTOL tiltrotor aircraft. FIGS. 1-2 depict three mutually orthogonal directions X, Y, and Z forming a three-dimensional frame of reference XYZ. Longitudinal axis X 14 corresponds to the roll axis that extends through the center of aircraft 10. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes tail member 38 extending from fuselage rear end 34 of fuselage 26. Aircraft 10 includes wing 42 and wing 46 extending from fuselage 26 substantially parallel to transverse axis Y 18. Wing 42 is coupled to propulsion system 50, and wing 46 is coupled to propulsion system 54. Propulsion system 50 includes rotor assembly 58, and propulsion system 54 includes rotor assembly 62. Rotor assembly 58 includes rotor hub 66 and plurality of rotor blades 70 extending from rotor hub 66. Similarly, rotor assembly 62 includes rotor hub 74 and plurality of rotor blades 78 extending from rotor hub 74. Aircraft 10 can, for example, be coupled to and controlled with a hybrid power system 88 connected to a drive system 16, such as one continuous drive system or a segmented drive system separated by a gearbox, including electric propulsion systems, hydraulic drive systems, or conventional drive systems, as discussed in detail below.

Rotor assemblies 58 and 62 are controllable and positionable to, for example, enable control of direction, thrust, and lift of aircraft 10. For example, FIG. 1 illustrates aircraft 10 in a first configuration, in which propulsion systems 50 and 54 are positioned to provide a lifting thrust to aircraft 10, if activated. In the embodiment shown in FIG. 1, propulsion systems 50 and 54 are positioned such that, if activated, aircraft 10 moves substantially in the Z direction ("helicopter mode"). In the embodiment shown in FIG. 1, aircraft 10 further includes landing gear 82 with which aircraft 10 can contact a landing surface.

FIG. 2 illustrates aircraft 10 in a second configuration, in which propulsion systems 50 and 54 are positioned to provide a forward thrust to aircraft 10, if activated. In the embodiment shown in FIG. 2, propulsion systems 50 and 54 are positioned such that, if activated, aircraft 10 moves substantially in the X direction ("airplane mode"). In the second configuration depicted in FIG. 2, wings 42 and 46 enable a lifting thrust to be provided to aircraft 10. Wings 42 and 46 can be configured to increase the wing span and wing aspect ratio, which thereby increases lift/draft ratio, aircraft efficiency, and fuel economy. Though not depicted in FIGS. 1-2, propulsion systems 50 and 54 can be controllably positioned in helicopter mode, airplane mode, or any position between helicopter mode and airplane mode to provide for a desired direction, thrust, and/or lift.

In one embodiment, shown schematically in FIGS. 1 and 2, the hybrid power system 88 includes a first power source 68 and a second power source 90. The first power source 68 can provide a power output for at least a forward flight mode to the drive system 16. In one embodiment, first power source 68 is a traditional combustion engine for an aircraft coupled to the drive system 16. In other embodiments, first power source 68 can be at least one of the following: a combustion engine, a hydraulic power system, an electronic power system, and a flywheel power system. The combustion engine can include an engine, shaft, and gearbox. The hydraulic power system can include a hydraulic pump and fluid reservoir. The electronic power system can include at least one of the following: an electric generator, a battery, and a fuel cell. The flywheel power system can comprise a mechanical power storage system that includes a rotor assembly (e.g., a main rotor for a helicopter) and/or a proprotor assembly for a tiltrotor (e.g. rotor assemblies 58, 62) that maintains rotational energy therein. A flywheel power system can provide an autorotative flight mode where the rotor assembly and/or proprotor assembly turns by action of air moving up through the rotor rather than engine power driving the rotor. The flywheel power system is typically needed in an emergency flight condition, such as when one or more engines are not operating. The flywheel power system can provide the aircraft an opportunity to land safely in the event of an engine failure. Consequently, all single-engine helicopters must demonstrate this capability to obtain an aircraft type certification.

In an embodiment, the second power source 90 is configured to provide a high specific power output for an altitude adjustment flight mode. In a preferred embodiment, the second power source 90 can provide a high specific power output into drive system 16 without the problems described above (e.g. without noise, heat and flame damage, and uncontrollable throttle). The altitude adjustment flight mode can include at least one of the following flight modes: a hover mode, a transition mode and an engine failure mode. The hover mode can include a landing mode and a take-off mode. The transition mode can be a flight mode including a portion of a hover mode and a portion of a forward flight mode that can, in some embodiments, occur concurrently.

In an embodiment, the second power source 90 is different than the first power source 68. The second power source 90 can be power dense such that it can provide a high specific power output and be at least one of the following: volumetrically compact and lightweight. In some embodiments, the second power source 90 has a smaller footprint (e.g. smaller volume) than the first power source 68. In some embodiments, the second power source 90 is lighter weight than the first power source 68. In preferred embodiments, second power source 90 provides a specific power output higher than the first power source 68 during altitude adjustment flight modes. In some embodiments, the second power source 90 has a higher power density than the first power source 68. In some embodiments, the second power source 90 can advantageously provide high power for short durations (in VTOL flight) with a lower total energy that can be lighter in weight and have a smaller footprint as compared to the first power source 68. This can be particularly advantageous for VTOL aircraft with large power requirement differences between hover and forward flight modes when the VTOL portion of the mission is a small amount of the total mission time.

In some embodiments, both the first power source 68 and second power source 90 are activated in a flight mode. In other embodiments, only the second power source 90 is activated. In an embodiment, the first power source 68 can be powered during a forward flight mode F, as shown in FIG. 4B. The second power source 90 can be powered during the hover mode H, as shown in FIG. 4B, and/or an engine failure mode. In an embodiment, as shown in FIG. 4B, the first and second power sources 68, 90 can be powered in a transition mode T, as shown in FIG. 4B.

The second power source 90, components thereof, and features relating thereto can provide sufficiently high specific energy for a desirable and/or required time intervals (e.g., 15 seconds, 30 seconds, 45 seconds, 1 minute, 1.5 minutes, 2 minutes, 2.5 minutes, 3 minutes, 4 minutes, 5 minutes, or more), which enables the second power source 90, components thereof, and features relating thereto to provide increased power for a time interval required for an altitude adjustment mode or to afford a pilot longer time intervals to recover from a failure of another power system, such as an engine.

The first and second power sources 68, 90 are coupled to the drive system 16. The drive system 16 can be at least one of the following: an electric system, a hydraulic pump system, a mechanical drive system, and combinations thereof. In an embodiment, the first and second power sources 68, 90 are operably coupled to the same type of drive system, e.g., both are coupled to a hydraulic pump system. In another embodiment, the first power source 68 is operably coupled to a different or dissimilar type of drive system than the second power source 90. In an exemplary embodiment shown in FIGS. 1-2, the first power source 68 is operably coupled to a mechanical drive system and the second power source 90 is operably coupled to a mechanical drive system.

In an embodiment, the second power source 90 includes an auxiliary gas generator 92 coupled to a turbine 96. When activated, the auxiliary gas generator 92 releases gas to rotate the turbine 96, which powers the drive system 16. The auxiliary gas generator 92 with the turbine 96 can provide a power output to the drive system 16 that can provide a high specific power. In some embodiments, the second power source 90 includes one or more auxiliary gas generators 92 that can be coupled to turbine 96. In an embodiment, the auxiliary gas generator 92 includes at least one of a combustion gas generator, a decomposition gas generator, a cool gas generator, and combinations thereof. In some embodiments, the auxiliary gas generator 92 is operable to provide a high power output for at least one altitude adjustment flight mode. The auxiliary gas generator 92 with the turbine 96 can be activated by the pilot or automatically controlled as part of the propulsion system 50.

Figure 3:
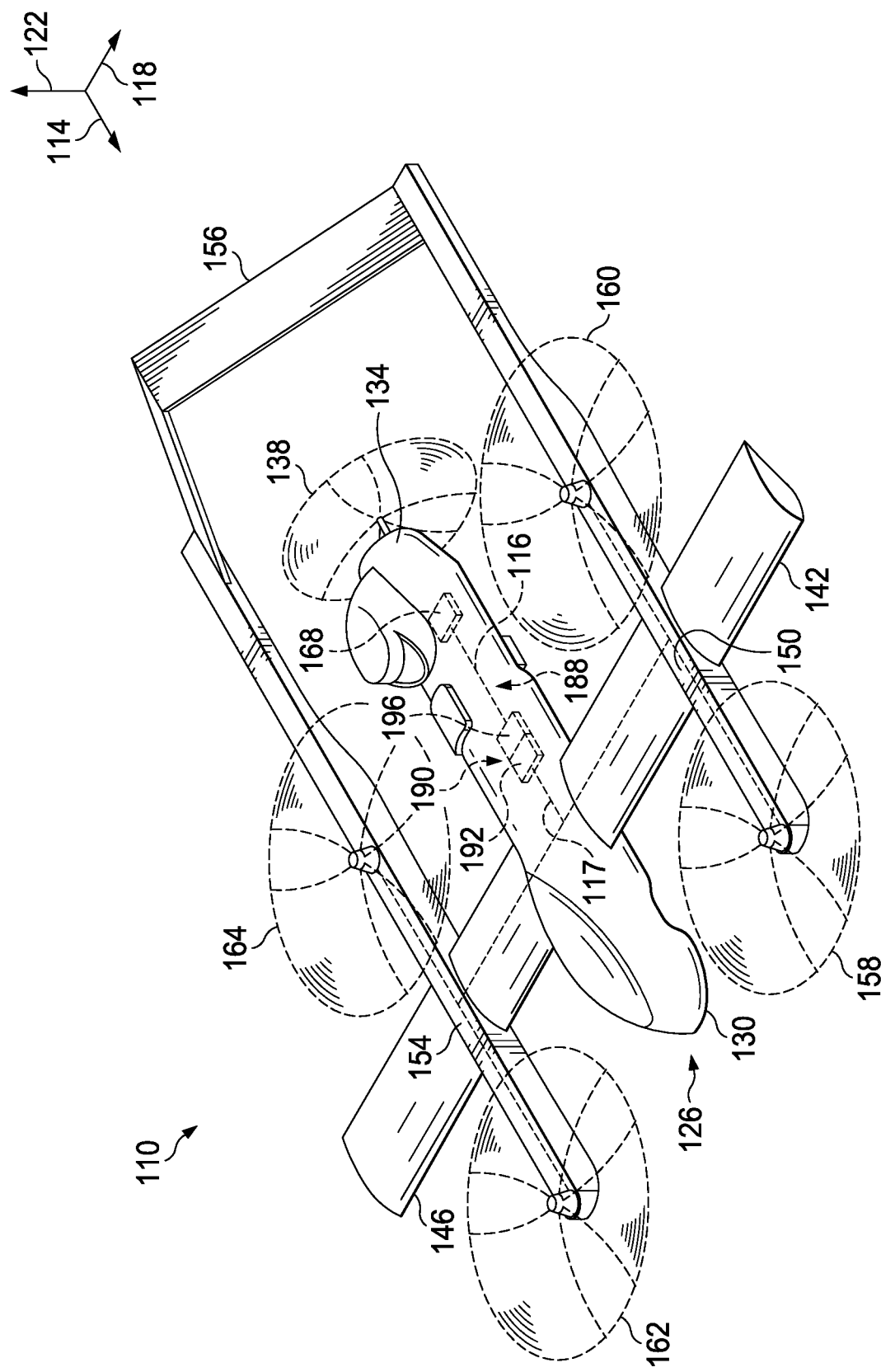
FIG. 3 is a perspective view of a VTOL aircraft, according to one example embodiment.

FIG. 3 depicts aircraft 110, which is a VTOL hybrid quadcopter fixed-wing aircraft. Aircraft 110 includes fuselage 126 as a central main body. Fuselage 126 extends parallel to longitudinal axis 114 from a fuselage front end 130 to a fuselage rear end 134. Aircraft 110 further includes propeller 138 extending from rear end 134 of fuselage 126. Aircraft 110 has wing 142 and wing 146 extending from fuselage 126 substantially parallel to transverse axis Y 118. Wing 142 is coupled to boom 150, and wing 146 is coupled to boom 154. Boom 150 and boom 154 are each substantially parallel to longitudinal axis 114 and, therefore, substantially parallel to fuselage 126. Boom 150 and boom 154 are coupled to tail member 156. Aircraft 110 further includes rotor assembly 158 forward of wing 142 and rotor assembly 160 aft of wing 142, each of which is coupled to boom 150. Aircraft 110 also includes rotor assembly 162 forward of wing 146 and rotor assembly 164 aft of wing 146, each of which is coupled to boom 154. Aircraft 110 can, for example, be coupled to and controlled with a power system connected to a drive system, such as one continuous drive system or a segmented drive system separated by a gearbox, including electric propulsion systems, hydraulic drive systems, or conventional drive systems, as discussed in detail below.

Rotor assemblies 158, 160, 162, and 164 and propeller 138 are controllable and positionable to, for example, enable control of direction, thrust, and lift of aircraft 110. For example, rotor assemblies 158, 160, 162, and 164 can, if activated, provide a lifting thrust to aircraft 110 during takeoff and landing to enable aircraft 110 to move substantially in the Z direction (e.g. an altitude adjustment flight mode). Furthermore, propeller 138 and rotor assemblies 158, 160, 162, and 164 can, if activated, provide a forward thrust to aircraft 110 to enable aircraft 110 to move substantially in the X direction. Additionally, wings 142 and 146 enable a lifting thrust to be provided to aircraft 110.

An exemplary hybrid power system 188 for the aircraft 110 is schematically shown in FIG. 3 and can include a first power source 168 and a second power source 190. In one embodiment, the first power source 168 is an electric engine with a battery. The first power source 168 is coupled to the drive system 116 to power the propeller 138. The second power source 190 includes at least one auxiliary gas generator 192 with a turbine 196 operably connected to the drive system 116 and to an electric drive system 117 to power rotor assemblies 158, 160, 162, 164. In an embodiment, the second power source 190 provides a high specific power output and is lighter weight than the first power source 168.

FIGS. 4A-9 depict power systems, components thereof, and features relating thereto. Any power system, component thereof, or feature relating thereto depicted in FIGS. 4A-9 and/or described herein can be used in combination with aircraft 10 and/or aircraft 110 depicted in FIGS. 1-3 and aircraft 810 depicted in FIG. 10 to operate as described herein. Additionally, the hybrid power systems, components thereof, and features relating thereto depicted in FIGS. 4A-9 and/or described herein can be used with any aircraft configured or configurable to include one or more power systems, including helicopters, tilt wing aircraft, unmanned aerial vehicles (UAVs), and other vertical lift or VTOL aircraft, or can further be used with any device configured or configurable to include a power system, including devices with propellers, windmills, and wind turbines. Further, any features of one embodiment of the one or more power systems or components thereof in this disclosure can be used with any other embodiment of the one or more power systems or components thereof in this disclosure such that the other embodiment has the same or similar features, operates in the same or similar way, or achieves the same or similar functions.

Figure 4A:
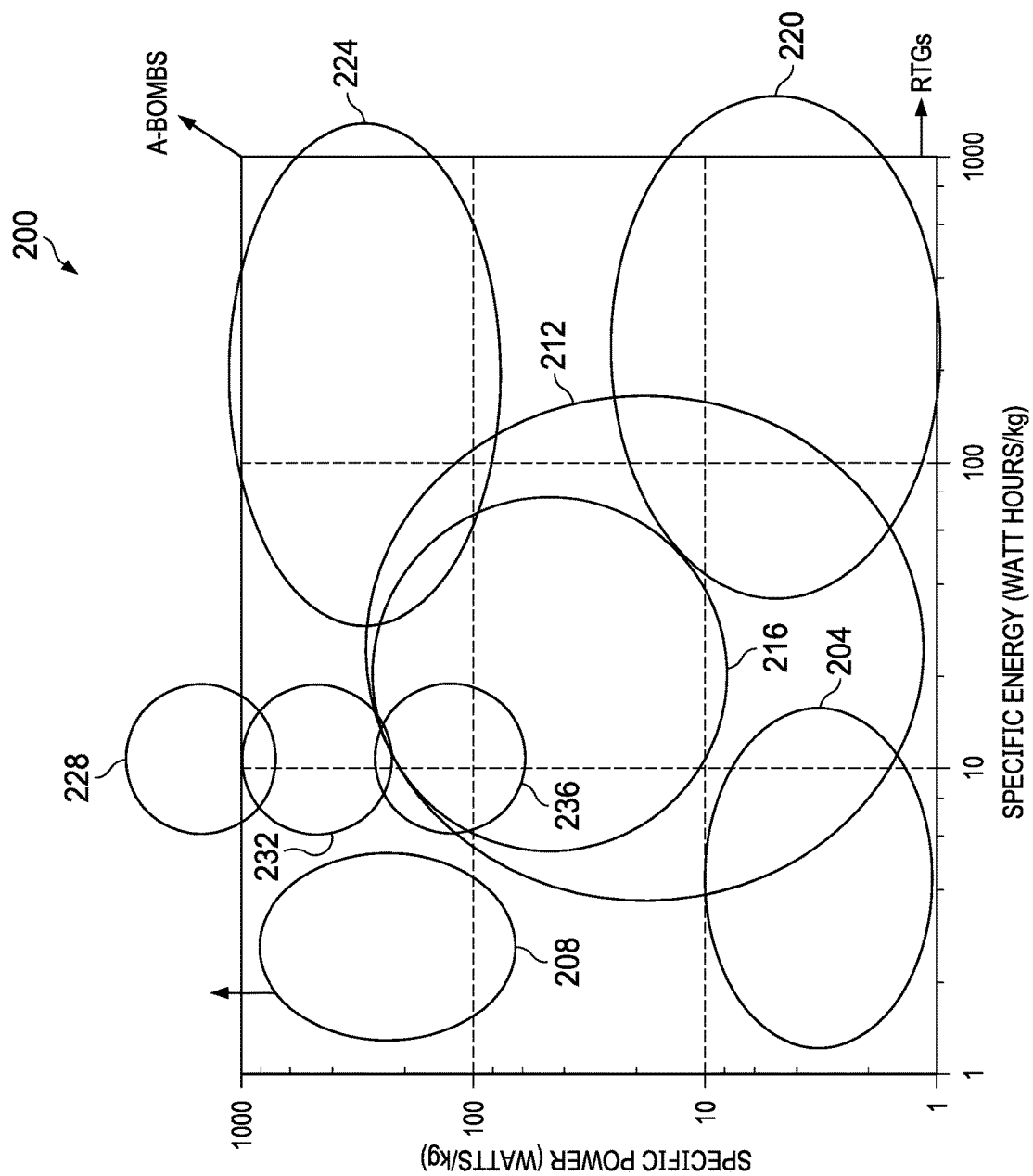
FIG. 4A is a graphical comparison of power systems, according to some exemplary embodiments.
Figure 4B:
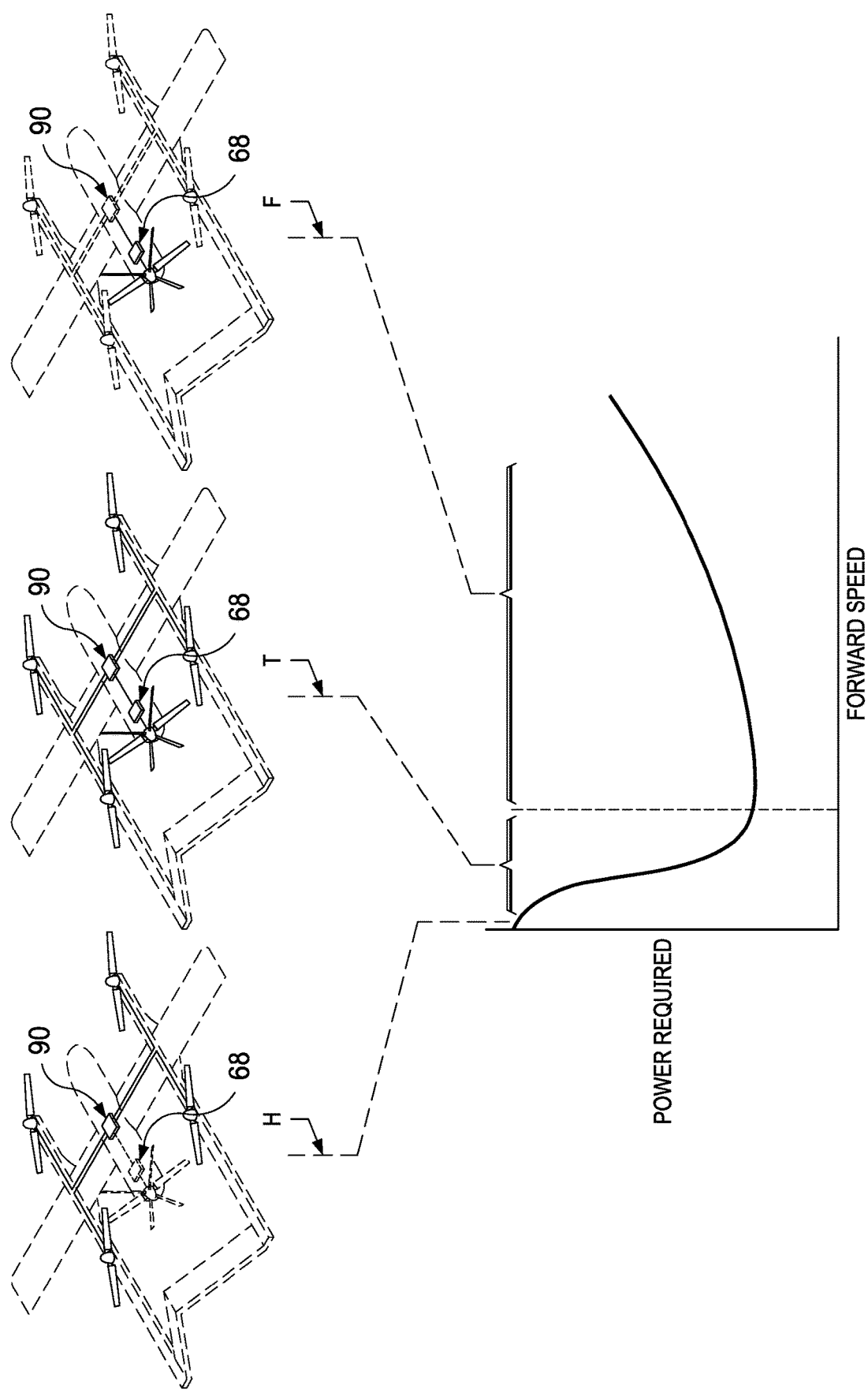
FIG. 4B is a graphical representation of power required during hover, transition, and forward flight modes, according to an illustrative embodiment.

FIG. 4A depicts graph 200, which is a comparison of the specific power (in Watts/kilogram) versus specific energy (in Watt-hours/kilogram) of various power systems that can be used in connection with an aircraft of this disclosure. Weight of an aircraft and its components, including the weight of an aircraft's one or more power systems, is taken into account when selecting and/or creating power systems for numerous reasons. For example, as the weight of an aircraft increases, more power is required to provide lift for the various aircraft functions and maneuvers. Furthermore, certain aircraft, such as VTOL aircraft, require increased power (e.g., 2, 3, 4, 5, 6, 7, or more times as much power) for certain functions and maneuvers, such as during hover mode H, transition mode T, and engine failure mode in comparison to the power required during forward flight mode F, as shown in FIG. 4B. Therefore, determining and/or observing the specific power and/or power density of various power systems assists in selecting and/or creating power systems by revealing a power system's power output for every kilogram that it adds to an aircraft's mass. Moreover, certain aircraft, such as VTOL aircraft, may require increased power levels for a sustained time interval, such as the time required to takeoff, land, hover for a desired time interval, and/or recover from engine failure. Therefore, as certain power systems may be capable of providing a high power output, but incapable of sustaining such high power output for a desired time interval, determining and/or observing the specific energy of various power systems assists in selecting and/or creating power systems by revealing a power system's available energy for every kilogram that it adds to an aircraft's mass. Additionally, fuel efficiency of a power system is taken into account because, for example, while a power system may be capable of providing increased power during certain functions and maneuvers, some power systems may cause high specific fuel consumption and inefficiencies in other flight modes.

For example, as depicted in FIG. 4A, compressed gas power systems 204 can have a low specific power (e.g., from 1 to 10 Watts/kilogram) and a low specific energy (e.g., from 1 to 20 Watt-hours/kilogram). Compressed gas power systems 204 does not provide advantageous specific power or specific energy relative to other power sources.

Super capacitors 208 can offer high specific power (e.g., from 60 to 800 Watts/kilogram), but only enough energy (e.g., from 1 to 6 Watt-hours/kilogram) to deliver the power for a short time interval (e.g., a few seconds at most). Batteries 212 can have a wide range of specific powers and specific energies, but typically range from 1 to 500 Watts/kilogram, which is lower than many engines, and from 5 to 300 Watt-hours/kilogram, respectively. Batteries 212 can provide specific energy for several hours but the specific power of batteries 212 is lower than most combustion engines 224, which does not provide an advantage in using batteries 212 for short term, high power when a combustion engine 224 is used as the first power source 68. Flywheel power systems 216, which can be, for example, employed in helicopter rotor systems to store energy, typically range from 5 to 80 Watt-hours/kilogram of specific energy and from 8 to 300 Watt-hours/kilogram in specific power. Fuel cells 220 can provide high specific energy (e.g., from 40 to greater than 1,000 Watt-hours/kilogram), but have low specific power (e.g., from 1 to 40 Watts/kilogram).

A combustion engine 224 can have both high specific energy (e.g., from 40 to greater than 1,000 Watt-hours/kilogram) and high specific power (e.g., from 80 to greater than 1,000 Watts/kilogram). However, a conventional combustion engine 224 is sized for the high specific power required in the hover and transition modes H, T of the mission even though those flight modes are only a small fraction of the overall mission. This results in a large, heavy combustion engine 224 (or engines) that reduces fuel capacity and range of the VTOL aircraft. In one embodiment, the first power source 68 can be a combustion engine 224 having at least one of the following: a smaller size, weighs less, and or less power than a conventional combustion engine 224 for a VTOL aircraft. For example, the first power source 68 can include a combustion engine 224 that operates only during the transition and forward flight modes T, F and the second power source 90 provide a high specific power output during the hover and transition flight modes H, T. In an illustrative example, the first power source 68 can be a combustion engine 224 that is a piston engine with power density of 200 W/Kg and the second power source 90 can have a specific power of at least 1,000 W/Kg. In another illustrative example, the first power source 68 can be a combustion engine 224 that is a turbine engine with a power density of 1,100 W/Kg and the second power source 90 can have a specific power of at least 3,000 W/Kg.

FIG. 4A further depicts specific power and specific energy ranges for illustrative embodiments of the auxiliary gas generator 92. Auxiliary gas generator 92 having a high specific power output can include at least one of a combustion gas generator 228, a decomposition gas generator 232, and a cool gas generator 236. In an embodiment, the auxiliary gas generator 92 provides a high specific power output that can generate a specific power of greater than or equal to 30 Watts/kilogram (e.g., 50 Watts/kilogram, 100 Watts/kilogram, 200 Watts/kilogram, 400 Watts/kilogram, 600 Watts/kilogram, 800 Watts/kilogram, 1,000 Watts/kilogram, or more) and a specific energy from about 5 Watt-hours/kilogram (e.g., 7.5 Watt-hours/kilogram, 8 Watt-hours/kilogram, and 9 Watt-hours/kilogram) to about 50 Watt-hours/kilogram (e.g., 10 Watt-hours/kilogram, 15 Watt-hours/kilogram, 20 Watt-hours/kilogram, 25 Watt-hours/kilogram, 30 Watt-hours/kilogram, 35 Watt-hours/kilogram, 40 Watt-hours/kilogram, 45 Watt-hours/kilogram). In one embodiment, auxiliary gas generator 92 provides a high specific power output that can generate a specific power of greater than or equal to 50 Watts/kilogram and a specific energy from about 5 Watt-hours/kilogram to about 30 Watt-hours/kilogram.

In an embodiment, the auxiliary gas generator 92 has a specific power higher than the specific power of the first power source 68. In one embodiment, the first power source 68 includes at least one of the following: an electronic power source and a flywheel power source. In another embodiment, the auxiliary gas generator 92 has a specific energy lower than the specific energy of the first power source 68. In an exemplary embodiment, the first power source 68 includes at least one of the following: a combustion engine and a hydraulic power source.

In an embodiment, the auxiliary gas generator 92 converts (or permits the conversion of) solid and/or liquid matter into gas. Two manners by which a gas generator can convert (or permit the conversion of) solid and/or liquid matter into gas is by combustion and decomposition. Energy released during such conversion can be harnessed to provide a power output. In an embodiment, a solid or liquid base substance and/or fuel material can expand hundreds and, even in some embodiments, thousands of times in volume, which generates thermal and pressure energy that can be harnessed by the auxiliary gas generator 92. The auxiliary gas generator 92 can include at least one fuel cartridge and/or a plurality of fuel cartridges. In some embodiments, the fuel cartridges are lightweight and compact as compared to compressed gas power systems 204, which requires large and heavy pressure vessels. The auxiliary gas generator 92 can provide a high specific power output while being relatively lightweight and compact as compared to the first power source 68.

Combustion gas generator 228 provides one example of the auxiliary gas generator 92. Combustion gas generator 228 creates energy from the conversion of a solid or liquid to a gas through combustion. Gas generator 228 can have specific power from 60 Watts/kilogram to greater than 1,000 Watts/kilogram and specific energy from 8 Watt-hours/kilogram to 20 Watt-hours/kilogram, depending on the type of gas generator, which enables gas generator 228 to provide high specific power over a time interval of up to several minutes and, in some instances, more. Combustion gas generator 228 provides one example of a high specific power gas generator that can be used to harness energy from the conversion of a solid or liquid to a gas through combustion. For example, combustion gas generator 228 can include solid or liquid propellant, such as a combination of, for example, oxidizer, fuel, and a binder. Combustion gas generator 228 can include at least one of the following: a liquid combustion gas generator, a solid propellant gas generator, and combinations thereof.

Figure 5:
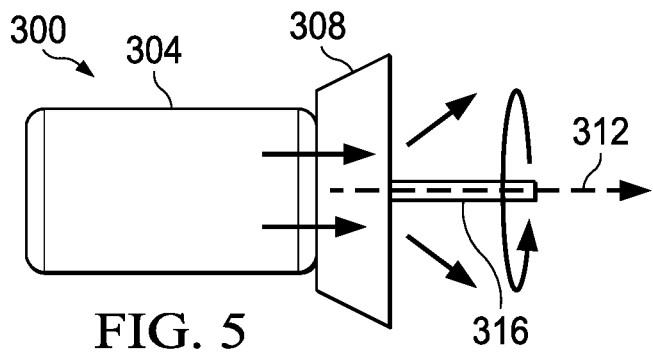
FIG. 5 is a depiction of a power system, according to one example embodiment.

In a preferred embodiment shown in FIG. 5, combustion gas generator 228 is a solid propellant gas generator 304. Solid propellant combustion gas generator 304 uses a solid propellant that includes an oxidizer, a fuel, and a binder combined into a solid granular form. When activated, solid propellant combustion gas generator 304 can produce energy through conversion of the propellant by combustion into high temperature (e.g., 2,000 degrees Fahrenheit, 3,000 degrees Fahrenheit, 4,000 degrees Fahrenheit, 5,000 degrees Fahrenheit, or more) and high pressure gas. Cooling agents can be introduced to the propellant, the stoichiometric ratio of the fuel in the propellant can be adjusted, and/or the stoichiometric ratio of the oxidizer can be adjusted, each of which can, for example, reduce the high temperature that can result in combustion gas generator 304. Various compositions appropriate for propellant are known in the art, for example, as described in *Gas Generator Propellants*; by Sutton, Vriesen, and Pacanowsky, available from the web: http://web.anl.gov/PCS/acsfuel/preprint%20archive/Files/12_2_SAN %20FRANCISCO_03-68_0065.pdf; and U.S. Pat. No. 3,362,859.

Figure 6:
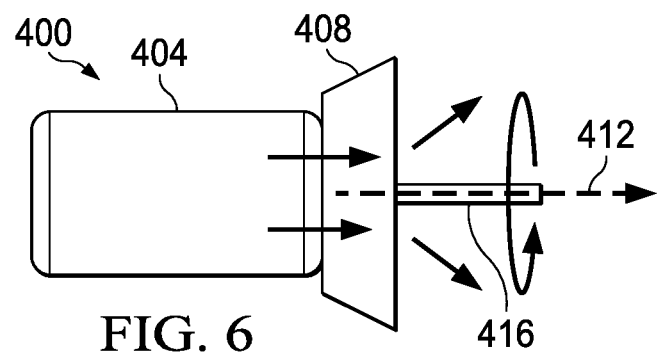
FIG. 6 is a depiction of another power system, according to one example embodiment.
Figure 7:
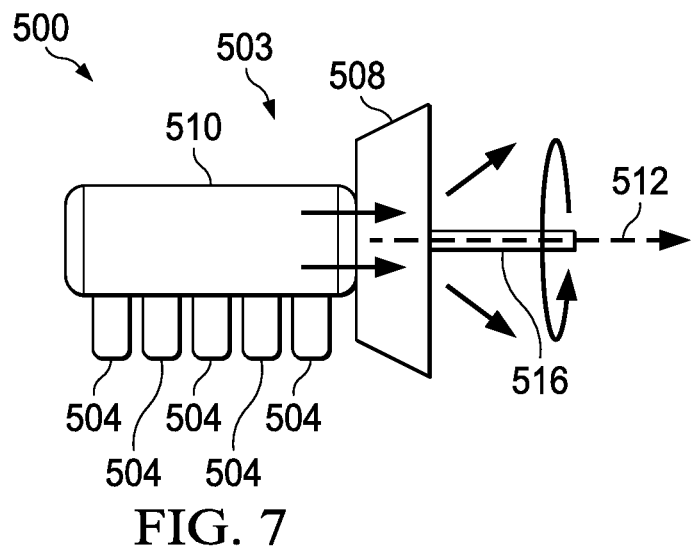
FIG. 7 is a depiction of still another power system, according to one example embodiment.

Decomposition gas generator 232 can be a decomposition thermal gas generator. Decomposition gas generator 232 provides another example of a high specific power gas generator that can be used to harness energy from the conversion of a solid decomposing material (e.g., sodium azide, nitroguanidine, etc.) or a liquid decomposing material (e.g., high purity hydrogen peroxide, and the like) to a gas through decomposition. When activated, decomposition gas generator 232 produces energy through conversion of solid or liquid propellant by decomposition (e.g., chemically) into high temperature (e.g., a temperature above about 100 degrees Fahrenheit; about 500 degrees Fahrenheit; about 1,000 degrees Fahrenheit; 1,500 degrees Fahrenheit; about 2,000 degrees Fahrenheit; or higher temperatures) and high pressure gas. Decomposition gas generator 232 enables conversion of solids and liquids to gas at a lower temperature than combustion gas generator 228. Furthermore, decomposition gas generator 232 produces energy from a decomposing material without solid particulate, flames, or smoke, which can improve the life of the turbine blade as compared power sources operating at higher temperatures. In an embodiment, a decomposition gas generator 232 includes a decomposing material that comprises hydrogen peroxide using a silver catalyst. Illustrative embodiments of decomposition gas generators 404, 500 are shown in FIGS. 6-7.

Figure 8:
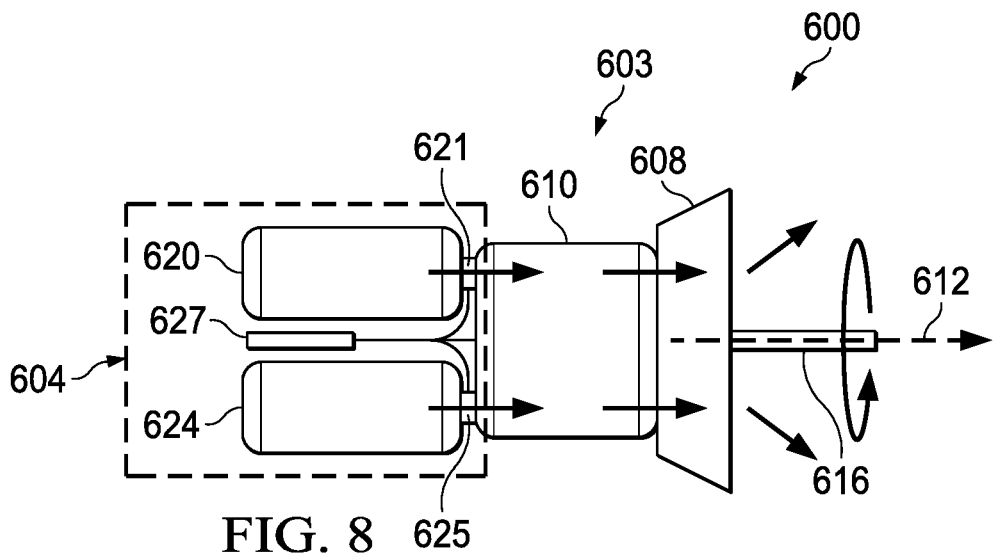
FIG. 8 is a depiction of yet another power system, according to one example embodiment.
Figure 9:
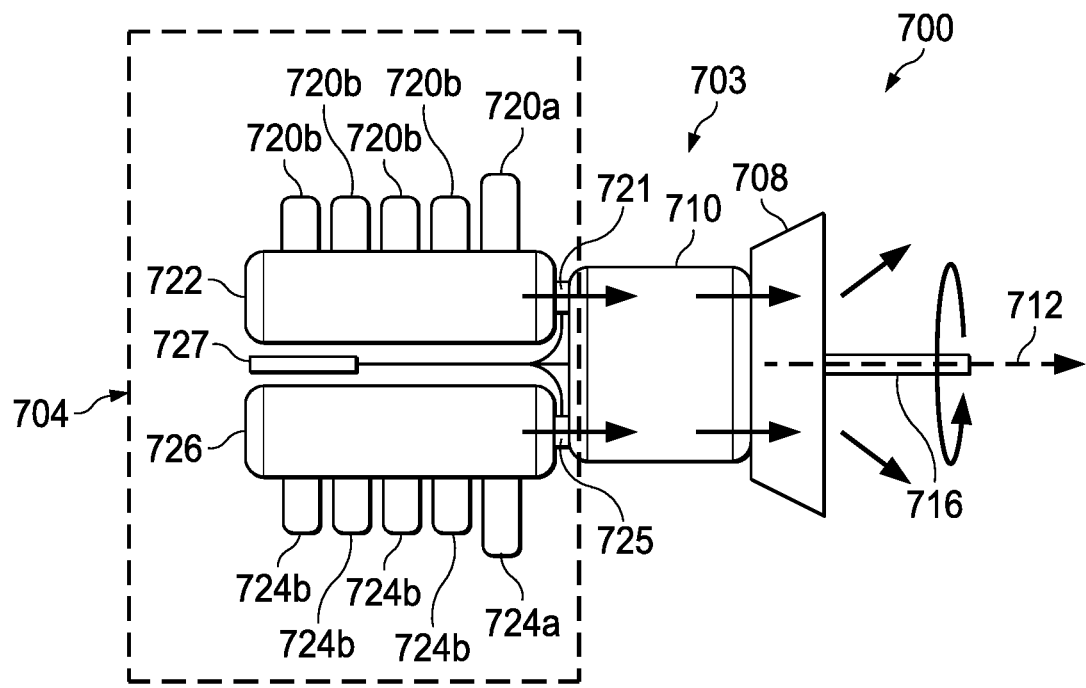
FIG. 9 is a depiction of another power system, according to one example embodiment.

A cool gas generator 236 is another example of an auxiliary gas generator 92. The cool gas generator 236 can generate energy from the conversion of a solid to a gas through decomposition at ambient temperatures. Propellant is chemically stored in solid form and, when activated, the propellant is released to produce gas (e.g., highly purified oxygen, hydrogen, nitrogen, carbon dioxide, methane, high yield gas, etc.) at ambient temperatures. Cool gas generator 236 produces energy through conversion of solid propellant by decomposition into gas. In some embodiments, cool gas generator 236 can produce energy through liquid decomposition. Cool gas generator 236 is typically lighter weight, require less ignition and spool-up response time, and less complex than engines that employ air, for example, by eliminating a compressor and a fuel pump/injection system. When activated, cool gas generator 236 produces energy at temperatures at about −50 degrees Celsius to about 60 degrees Celsius. In an embodiment, the cool gas generator 236 is commercially available from CGG Safety & Systems (http://www.cggss.com). Illustrative embodiments of cool gas generator 236 are shown in FIGS. 8-9.

The hybrid power systems and sources of this disclosure are depicted by graphic shapes and symbols in FIGS. 5-9. Unless this disclosure specifies otherwise, the components of the present hybrid power systems and sources should be understood to include the same or similar characteristics and features as those components that are named or described, though the graphic shapes and symbols may not depict each such characteristic or feature. Furthermore, though the hybrid power systems and sources in FIGS. 5-9 are depicted as one power source, one or more such power sources or systems can be used with an aircraft, as desired or as necessary, to provide the same or similar characteristics and features. Similarly, though FIGS. 5-9 may depict a power source having only one component, one or more of such components can be used with the power source, as desired or as necessary, to provide the same or similar characteristics and features.

FIG. 5 depicts one embodiment of a second power source 300. Second power source 300 includes at least one gas auxiliary generator 304 (e.g., one gas generator, in the embodiment shown). Second power source 300 further includes at least one turbine 308 (e.g., one turbine, in the embodiment shown) configured to be coupled to and in communication with auxiliary gas generator 304 (e.g., in fluid communication with auxiliary gas generator 304). In an embodiment, auxiliary gas generator 304 is a solid propellant combustion gas generator that can be operated at temperatures from about 2,000 degrees to about 5,000 degrees Fahrenheit. In an embodiment, the auxiliary gas generator 304 can include contents therein that can be a solid propellant. In some embodiments, the contents in the gas generator can be a liquid propellant.

Turbine 308 can have the same or similar features as turbines used to provide power to aircraft. For example, turbine 308 can have a plurality of blades that rotate when contacted by fluid (gas, in this embodiment) passing through turbine 308. Turbine 308 can further have a plurality of guide vanes or nozzle vanes that encourage fluid flow from one turbine blade to another turbine blade. Turbine 308 can be an axial flow turbine, in which gas from gas generator 304 flows substantially parallel to central axis 312 of turbine 308, or a radial turbine, in which gas from gas generator 304 flows substantially radially about central axis 312 of turbine 308. Second power source 300 (and, more specifically, turbine 308) is configured to be coupled to drive system 316 of an aircraft (e.g., such as VTOL aircraft 10, VTOL aircraft 110, and the like). If the aircraft requires additional, auxiliary, or secondary power, the second power source 300 can be activated to provide a high power to drive system 316.

Drive system 316 can include an electric propulsion system having an electric generator, a hydraulic drive system having a hydraulic pump, or a conventional drive system having a shaft and a gearbox. Another power source, such as a power source with a higher specific energy (e.g., a traditional aircraft engine), can also be coupled to drive system 316 and/or can be coupled to a separate drive system to provide additional power to an aircraft.

The second power source 300 can operate in a VTOL aircraft as follows. A VTOL aircraft can include one or more first power sources, such as a traditional aircraft engine, that has a high specific energy and can provide power over a sustained time interval for a forward flight mode. The VTOL aircraft can include second power source 300, for example, to provide additional power output to the VTOL aircraft for an altitude adjustment flight mode, as necessary. Auxiliary gas generator 304 of second power source 300 can be a combustion gas generator (e.g., with the same or similar features and characteristics as combustion gas generator 228 described above). When the VTOL aircraft is in an altitude adjustment flight mode, gas generator 304 converts (or enables the conversion of) a solid or liquid propellant to a gas through combustion to release high temperature and high pressure gas. High temperature and high pressure gas released from gas generator 304 passes into turbine 308 to enable turbine 308 to create power, which can be transferred to drive system 316. Drive system 316 can be coupled to one or more rotors, propellers, wings, or other components that assist in providing lift for the VTOL aircraft. Second power source 300 can be activated, for example, when the VTOL aircraft requires increased power, such as during takeoff, landing, hover, and/or failure of the first power source.

FIG. 6 depicts another embodiment of a second power source 400 that can include at least one gas generator 404 (e.g., one gas generator, in the embodiment shown). Certain components of the second power source 400 are as described above in connection with the second power source 300, except as noted herein. In one embodiment, auxiliary gas generator 404 of power source 400 can be a decomposition gas generator (e.g., with the same or similar features and characteristics as decomposition gas generator 232 described above). When activated, auxiliary gas generator 404 converts (or enables the conversion of) a solid or liquid propellant to a gas through decomposition to release high temperature and high pressure gas. High temperature and high pressure gas released from the auxiliary gas generator 404 passes into turbine 408 to enable turbine 408 to create power, which can be transferred to drive system 416.

FIG. 7 depicts another embodiment of a second power source 500. Certain components of the second power source 500 are as described above in connection with the second power source 300, except as noted herein. Auxiliary gas generator 503 can be configured as at least one of the following: a combustion gas generator, a decomposition gas generator, a cool gas generator, and combinations thereof. Auxiliary gas generator 503 can include at least one gas generator cartridge 504 (e.g., five gas generator cartridges 504, in the embodiment shown) and a plenum chamber 510. In other embodiments, auxiliary gas generator 503 can include less than five gas generator cartridges 504 (e.g., four, three, or two) or more than five gas generator cartridges 504 (e.g., six, seven, eight, nine, ten, or more) depending, for example, on a desired pressure and flow within auxiliary gas generator 503, on a predicted number of instances in which increased power is desired, and other considerations.

In some embodiments, gas cartridges 504 contain therein at least one of the following: a solid propellant, a liquid propellant, a solid decomposing material, a liquid decomposing material, and combinations thereof. In one embodiment, there can be different types of contents in the gas cartridges 504. For example, and not limitation, one gas cartridge 504 can include a solid propellant and/or a liquid propellant therein and the other four cartridges 504 can include a decomposing material therein. Gas cartridges 504 can have the same or similar features and characteristics as combustion gas generator 228 and decomposition gas generator 232 described above. It should be appreciated that gas cartridges 504 can take on a wide variety of configurations (e.g. varied sizes for holding desired amounts of contents therein, different contents, etc.). For example, there can be two, three or more solid or liquid propellant filled cartridges and one or more cartridges having a decomposing material therein.

Auxiliary gas generator 503 includes a plenum chamber 510 that is configured to be disposed between gas generator cartridges 504 and turbine 508 (and is disposed between gas generator cartridges 504 and turbine 508, in the embodiment shown). The gas generator cartridges 504 are each depicted coupled to and in fluid communication with plenum chamber 510 and can each be activated individually to enable the contents therein to release into plenum chamber 510. Plenum chamber 510 is depicted coupled to and in fluid communication with turbine 508 to enable gas within plenum chamber 510 to release into turbine 508.

Gas generator cartridges 504 can be releasable from plenum chamber 510 to enable replacement of one or more of gas generator cartridges 504 after use. Independent activation of each of gas generator cartridge 504 advantageously enables improved control over pressure and flow within plenum chamber 510 and turbine 508. In addition, unused cartridges 504 can be used a later time in the mission or even on a separate mission giving better flexibility in generating the gas when it is needed. Auxiliary gas generator 503 provides the opportunity for multiple separate firings of cartridges 504 to provide multiple high specific power outputs during one or multiple missions without needing to replace any or all of the cartridges 504.

Auxiliary gas generator 503 can operate with a VTOL aircraft as follows. A VTOL aircraft can include a first power source, such as a traditional aircraft engine, that has a high specific energy and can provide power over a sustained time interval for a forward flight mode. The VTOL aircraft can include auxiliary gas generator 503 as a second power source to, for example, provide increased power to the VTOL aircraft, as necessary. When one or more of the gas generator cartridges 504 are activated, one or more gas generator cartridges 504 convert (or enable the conversion of) a solid or liquid propellant to a gas through combustion or decomposition to release high temperature and high pressure gas. High temperature and high pressure gas released from one or more gas generator cartridges 504 passes into turbine 508 to enable turbine 508 to create power, which can be transferred to drive system 516. The number of activated gas cartridges 504 can determine the length of time and/or the amount of the high specific power provided by the auxiliary gas generator 503 to the VTOL during an altitude adjustment flight mode.

FIG. 8 depicts an embodiment of a second power source 600 that can include at least one auxiliary gas generator 603. Certain components of the second power source 600 are as described above in connection with the second power source 500, except as noted herein. The auxiliary gas generator 603 can include a cool gas generator 604 and a combustion chamber 610.

Second power source 600 further includes at least one turbine 608 (e.g., one turbine, in the embodiment shown) configured to be coupled to and in fluid communication with cool gas generator 604 (e.g., and is depicted coupled to and in fluid communication with cool gas generator 604 via combustion chamber 610). Combustion chamber 610 is configured to be disposed between cool gas generator 604 and turbine 608. Gas generator 604 is depicted coupled to and in fluid communication with combustion chamber 610 and can be activated to enable the contents of gas generator 604 to release into combustion chamber 610.

In an embodiment, the auxiliary gas generator 603 can include a control system 627 including control valves 621, 625 for controlling the release of the contents in the cool gas generator 604 into the combustion chamber 610 to regulate turbine 608 power output. The control system 627 can be in communication with the combustion chamber 610 and can include a sensor (not shown) to measure combustion chamber 610 temperature and pressure.

In the embodiment shown, cool gas generator 604 includes oxidizing chamber 620 and fuel chamber 624, each of which is configured to be coupled to and in fluid communication with turbine 608 via combustion chamber 610 (e.g., and each is depicted coupled to and in fluid communication with turbine 608 via combustion chamber 610). The contents of oxidizing chamber 620 and fuel chamber 624 can be released into combustion chamber 610 via control valves 621, 625, respectively, that are commanded by control system 627. The control valves 621, 625 can throttle the flow of gas from the oxidizing and fuel chambers 620, 624 into the combustion chamber 610 to adjust the fuel to oxidizer ratio and control the temperature at the turbine 608 inlet to provide power to the turbine 608.

Auxiliary gas generator 603 can operate with a VTOL aircraft as follows. A VTOL aircraft can include a first power source, such as a traditional aircraft engine, that has a high specific energy and can provide power over a sustained time interval. The VTOL aircraft can include cool gas generator 603 as a second power source to, for example, provide increased power to the VTOL aircraft, as necessary. The gas generator 604 portion of auxiliary gas generator 603 can be a cool gas generator (e.g., with the same or similar features and characteristics as cool gas generator 236 described above). When activated, cool gas generator 604 (and, more specifically, oxidizing chamber 620) converts (or enables the conversion of) a solid propellant to a gas through decomposition to release gas at ambient temperature into combustion chamber 610. Similarly, when activated, cool gas generator 604 (and, more specifically, fuel chamber 624) releases fuel into combustion chamber 610. Mixture of the contents of oxidizing chamber 620 and fuel chamber 624 in combustion chamber 610 creates a high temperature and high pressure gas that passes into turbine 608 to enable turbine 608 to create power, which can be transferred to drive system 616. For embodiments requiring a high power density, the gases can be individually generated by each of the oxidizing chamber 620 and fuel chamber 624 then combined in the combustion chamber 610 and expanded through the power turbine 608.

FIG. 9 depicts another embodiment of a second power source 700 that can include at least one auxiliary gas generator 703. Certain components of the second power source 700 are as described above in connection with the second power source 600, except as noted herein. Cool gas generator 704 is depicted coupled to and in fluid communication with combustion chamber 710 and can be activated to enable the contents of gas generator 704 to release into combustion chamber 710.

In the embodiment shown, cool gas generator 704 includes at least one oxidizer cartridge 720a (e.g., five oxidizer cartridges 720a, 720b, in the embodiment shown) configured to be coupled to and in fluid communication with (e.g., and depicted coupled to and in fluid communication with) oxidizer plenum chamber 722. In other embodiments, cool gas generator 700 can include less than five oxidizer cartridges 720 (e.g., four, three, or two) or more than five oxidizer cartridges 720 (e.g., six, seven, eight, nine, ten, or more) depending, for example, on a desired pressure and flow within cool gas generator 700, on a predicted number of instances in which increased power is desired, and other considerations. Gas generator 704 further includes at least one fuel cartridge 724a (e.g., five fuel cartridges 724a, 724b, in the embodiment shown) configured to be coupled to and in fluid communication with (e.g., and depicted coupled to and in fluid communication with) fuel plenum chamber 726. In other embodiments, cool gas generator 700 can include less than five fuel cartridges 724 (e.g., four, three, or two) or more than five fuel cartridges 724 (e.g., six, seven, eight, nine, ten, or more) depending, for example, on a desired pressure and flow within cool gas generator 700, on a predicted number of instances in which increased power is desired, and other considerations.

In one embodiment, at least one oxidizer cartridge 720a and one fuel cartridge 724a has a size different from at least one of the other oxidizer and fuel cartridges 720b, 724b. In an illustrative embodiment shown in FIG. 9, the oxidizer cartridge 720a and fuel cartridge 724a are larger than the other oxidizer and fuel cartridges 720b, 724b. The larger size oxidizer and fuel cartridges 720a, 724a can be used for an altitude adjustment flight mode that requires a higher specific power than the other flight modes (e.g., a hover mode and/or an engine failure mode can require more power than a transition mode and/or a forward flight mode). The larger volume oxidizer and fuel cartridges 720a, 724a contain a larger amount of oxidizer and fuel materials therein for the altitude adjustment flight mode needing a high specific power output. It should be appreciated that the size of the oxidizer and/or fuel cartridges 720a, 724a may take on a wide variety of configurations. For example, the oxidizer cartridge 720a may be larger or smaller than the fuel cartridge 724a. In another example, the oxidizer and/or fuel cartridges 720a, 724a, 720b, 724b can be any combination of small and large sized cartridges configured to achieve a high power output for an altitude adjustment flight mode.

Oxidizer plenum chamber 722 and fuel plenum chamber 726 are each configured to be disposed between, coupled to, and in fluid communication with turbine 708 via combustion chamber 710 (e.g., and each is depicted disposed between, coupled to, and in fluid communication with turbine 708 via combustion chamber 710). Oxidizer cartridges 720a, 720b can each be activated individually to enable the contents of each of oxidizer cartridges 720a, 720b to release into oxidizer plenum chamber 722. Oxidizer cartridges 720a, 720b can also each be releasable from oxidizer plenum chamber 722 to enable replacement of one or more of oxidizer cartridges 720a, 720b after use. Similarly, fuel cartridges 724a, 724b can each be activated individually to enable the contents of each of fuel cartridges 724a, 724b to release into fuel plenum chamber 726. Fuel cartridges 724a, 724b can also each be releasable from fuel plenum chamber 726 to enable replacement of one or more of fuel cartridges 724a, 724b after use. Independent activation of each of oxidizer cartridges 720a, 720b and fuel cartridges 724a, 724b enables improved control over pressure and flow within oxidizer plenum chamber 722, fuel plenum chamber 726, combustion chamber 710, and turbine 708. The contents of oxidizer plenum chamber 722 and fuel plenum chamber 726 can be released into combustion chamber 710.

In an embodiment, cool gas generator 704 permits control of an inlet temperature at turbine 708 by controlling a rate at which fluid enters turbine 708 through, for example, control of combustion chamber 710, control of release of the contents of oxidizer plenum chamber 722, control of release of the contents of fuel plenum chamber 726, control of release of the contents of oxidizer cartridges 720, control of release of the contents of fuel cartridges 724, and the like.

In some embodiments, auxiliary gas generator 703 can include a control system 727 with control valves 721, 725 to regulate the flow from the oxidizer and fuel plenum chambers 722, 726 into the combustion chamber 710. Control system 727 in combination with the firing sequence of the oxidizer and fuel cartridges 720a, 720b, 724a, 724b can throttle the gas temperature and pressure in the combustion chamber 710 to control the mechanical power output of the turbine 708.

Auxiliary gas generator 703 can operate with a VTOL aircraft as follows. A VTOL aircraft can include a first power source, such as a traditional aircraft engine, that has a high specific energy and can provide power over a sustained time interval. The VTOL aircraft can include auxiliary gas generator 703 as a second power source to, for example, provide increased power to the VTOL aircraft, as necessary. Gas generator 704 of auxiliary gas generator 703 can be a cool gas generator (e.g., with the same or similar features and characteristics as cool gas generator 236 described above). When one or more of oxidizer cartridges 720 are activated, cool gas generator 704 (and, more specifically, oxidizer cartridges 720 and oxidizer plenum chamber 722) converts (or enables the conversion of) a solid propellant to a gas through decomposition to release gas at ambient temperature into combustion chamber 710. Similarly, when one or more of fuel cartridges 724 are activated, gas generator 704 (and, more specifically, fuel cartridges 724 and fuel plenum chamber 726) releases fuel into combustion chamber 710. The mixture of the contents of oxidizer plenum chamber 722 and fuel plenum chamber 726 in combustion chamber 710 creates a high temperature and high pressure gas that passes into turbine 708 to enable turbine 708 to create power, which can be transferred to drive system 716.

For VTOL aircraft missions requiring a high power density, the embodiments of the auxiliary gas generators 603, 703 can provide advantages over other systems. In particular, gases can be individually generated by the cool gas generators 604, 704 then combined in the combustion chamber 610, 710 and expanded through the power turbine 608, 708 without exceeding thermal material limitations. In comparing the auxiliary gas generators 603, 703 to a conventional combustion engine (e.g., an "air" breathing engine), the auxiliary gas generators 603, 703 do not need a compressor, fuel pump, etc. Accordingly, the auxiliary gas generators 603, 703 are less complex and weigh less than a conventional combustion engine. In addition, the ignition and spool-up response time can be significantly shorter than a conventional combustion engine. The auxiliary gas generators 603, 703 can provide a higher specific power as compared to a conventional combustion engine.

As discussed above, the hybrid power systems of this disclosure, components thereof, and features relating thereto can be used in combination with an aircraft, such as a VTOL aircraft, including aircraft 10 and/or aircraft 110 depicted in FIGS. 1-3 to operate as described herein.

Figure 10:
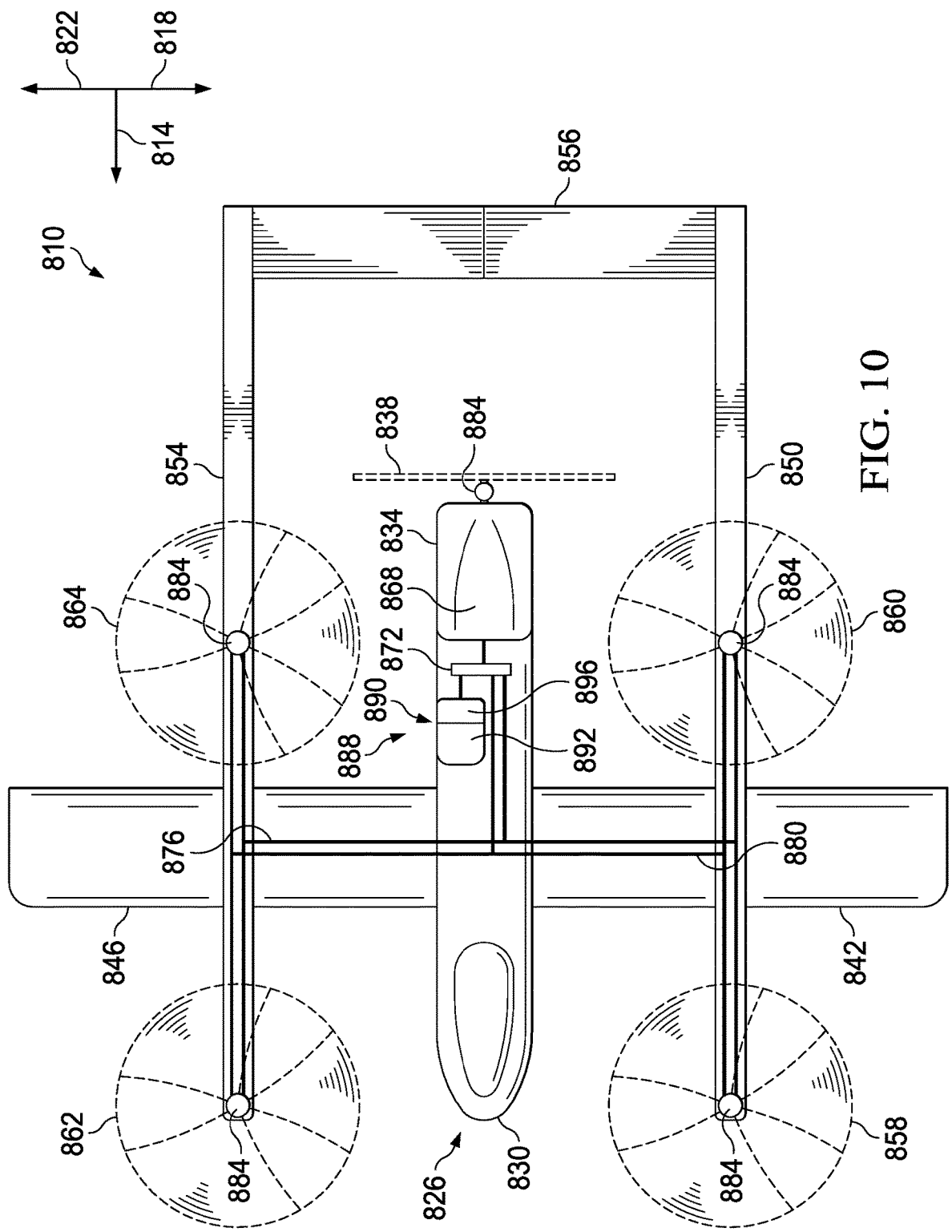
FIG. 10 is a top view of an aircraft, according to one example embodiment.

FIG. 10 depicts another embodiment of the hybrid power system of this disclosure on VTOL aircraft 810, which is a VTOL hybrid quadcopter fixed-wing aircraft. Certain features of the aircraft 810 are as described above and bear similar reference characters to the aircraft 110, but with a leading '8' rather than a leading '1'. The VTOL aircraft 810 is configured to provide VTOL capabilities with minimal impact on payload and endurance and includes a quadcopter 858, 860, 862, 864 configuration on twin structural booms 850, 854, which requires nearly three times the power generated from the fixed wing 842, 846 during flight mode. Second power source 890 includes an auxiliary gas generator 892 having a compact footprint and high power output that provides twice the normal engine power, with only a quarter of the weight of a normal engine to add torque/power to the hydraulic pump 872 during takeoff and landing hover modes for approximately 30-60 seconds. Advantageously aircraft 810 has VTOL capability for takeoff and landing modes without significant reduction in fixed wing payload and range.

Aircraft 810 includes a hybrid power system 888 having a first power source 868 and a second power source 890. First power source 868, can be, for example, a traditional aircraft engine. First power source 868 is coupled to a drive system, which, in the embodiment shown, is a hydraulic drive system including hydraulic pump 872, high pressure drive line 876, and return line 880. The hydraulic drive system is coupled to rotor assemblies 858, 860, 862, and 864 and propeller 838 (each of which includes hydraulic motor 884) to provide power to rotor assemblies 858, 860, 862, and 864 and propeller 838 (and, more specifically, to hydraulic motors 884) to enable rotor assemblies 858, 860, 862, and 864 and propeller 838, through rotation, to provide lift to aircraft 810.

Second power source 890 includes an auxiliary gas generator 892 (e.g., which can be any gas generator of this disclosure, such as, for example, gas generator 304, 404, 504, 604, and 704) coupled to and in fluid communication with turbine 896 (e.g., which can be any turbine of this disclosure, such as, for example, turbine 308, 408, 508, 608, 708, respectively) and configured to operate as described above. For example, when activated, auxiliary gas generator 892 converts (or enables the conversion of) a solid or liquid propellant to a gas through combustion to release high temperature and high pressure gas. High temperature and high pressure gas released from auxiliary gas generator 892 passes into turbine 896 to enable turbine 896 to create power, which can be transferred to hydraulic drive system. Hydraulic pump 872 is coupled to rotor assemblies 858, 860, 862, and 864 and propeller 838 via high pressure drive line 876 and return line 880 that assist in providing lift for aircraft 810. Second power source 890 can be activated, for example, when aircraft 810 requires increased power, such as during takeoff, landing, hover, and/or failure of the first power source.

In an illustrative embodiment, auxiliary gas generator 892 has a compact footprint and high power output that provides twice the normal engine power while being only a quarter of the weight of a normal engine. The auxiliary gas generator 892 can add torque/power to the hydraulic pump 872 for approximately 30-60 seconds during takeoff and landing hover modes. Advantageously the aircraft 810 with the hybrid power system described herein has VTOL capability for takeoff and landing modes without a significant reduction in fixed wing payload and range.

Accordingly, with use of the hybrid power system described herein, a conventional fixed wing aircraft can be modified to have VTOL characteristics with minimal impact to payload and endurance and without altering existing power systems, notwithstanding a significant increase in power requirements to enable takeoff, landing, and hovering of an aircraft. For example, the present hybrid power system 888 can increase aircraft power by 2, 3, 4, 5, or more times by adding only 50%, 25%, 15%, 10%, or less weight to the aircraft.

Similar such modifications to existing aircraft or design of new aircraft using the present hybrid power systems can achieve the same or similar results. For example, other VTOL aircraft, such as tiltrotor aircraft 10 and helicopters can be modified and/or designed to include the present hybrid power systems to increase power, such as during takeoff, landing, hover, and/or failure of the first power source (e.g., an engine-out condition, which can be assisted by adding a burst of power when engine-out conditions occur).

The present disclosure further includes methods, such as those for providing power to a VTOL aircraft. Such methods include, for example, providing a first power source (e.g., an engine); providing a second power source (e.g., one or more of second power systems 300, 400, 500, 600, and 700) including an auxiliary gas generator and a turbine in communication with the auxiliary gas generator; providing a rotor assembly; powering the rotor assembly using the first power source to provide lift to the aircraft; and activating the second power source to power the rotor assembly when the aircraft is in an altitude adjustment flight mode. In an embodiment, the second power source (e.g., one or more of second power systems 300, 400, 500, 600, and 700) has a higher specific power than the first power source and a lower specific energy than the first power source. In some embodiments, the auxiliary gas generator includes at least one of the following: a combustion gas generator, a decomposition gas generator, a cool gas generator, and combinations thereof.

The hybrid power systems, components thereof, and features relating thereto that are detailed above provide numerous advantages to aircraft, including VTOL aircraft. For example, the hybrid power systems, components thereof, and features relating thereto configured in accordance with the above disclosure can provide an aircraft with one or more power systems having high specific power and power density, affording the aircraft increased power during certain functions and maneuvers, such as during takeoff, landing, hovering, and failure of other power systems), as well as increased control over such high specific power and high power density power systems. Furthermore, the hybrid power systems, components thereof, and features relating thereto are lightweight and compact relative to, for example, traditional power systems, such as an engine, which reduces fuel inefficiencies and weight inefficiencies (e.g., increasing payload of the aircraft) that can occur from duplicative traditional power systems during forward flight. The hybrid power systems described herein can be less complex than other traditional power systems and do not require a compressor and a fuel pump/injection system.

The embodiments of the hybrid power systems described herein are particularly advantageous for VTOL aircraft with large power requirement differences between hover and forward flight modes where the VTOL portion of the mission is a minimal portion of the total mission time.

The embodiments of the hybrid power systems described herein are also particularly advantageous for VTOL aircraft experiencing an engine inoperative condition. In single helicopter configurations a pilot only has a short window of time to take decisive action to land safely. The power to safely flair and land is stored as kinetic energy (e.g., flywheel) in the rotor system, but quickly bleeds off in a few seconds. Multi-engine helicopters can have some reserve power, depending on the flight condition, but can also benefit from a short-term power boost provided by the second power system 90. The additional boost of power over a short period of time provided by the second power system 90 can provide greater flexibility in handling engine out conditions and can eliminate operating in undesirable portion of a height velocity diagram (e.g., the "Deadman's Curve"), which is the portion of the helicopter flight envelope where a safe recovery is not possible from engine failure.

The hybrid power systems, components thereof, and features relating thereto that are detailed above provide numerous advantages to aircraft, including VTOL aircraft. For example, the hybrid power systems, components thereof, and features relating thereto configured in accordance with the above disclosure can provide an aircraft with one or more power systems having high specific power and power density, affording the aircraft increased power during certain functions and maneuvers, such as during takeoff, landing, hovering, and failure of other power systems), as well as increased control over such high specific power and high power density power systems. Furthermore, the present hybrid power systems, components thereof, and features relating thereto are lightweight and compact relative to, for example, traditional power systems, such as an engine, which reduces fuel inefficiencies and weight inefficiencies that can occur from duplicative traditional power systems during forward flight.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A hybrid power system for a vertical takeoff and landing aircraft comprising:
   a first power source operable to provide a power output for at least a forward flight mode, the first power source comprising at least one of the following: a combustion engine, a hydraulic power source, and an electric engine with a battery; and
   a second power source configured to provide an additional power output for an altitude adjustment flight mode, the second power source is different than the first power source, the second power source comprising a decomposition gas generator coupled to a turbine and a drive system, the decomposition gas generator comprising a plurality of gas cartridges; and
   a plenum chamber disposed between the turbine and the plurality of gas cartridges, the plenum chamber in fluid communication with the turbine and the plurality of gas cartridges;
   wherein the decomposition gas generator is configured such that each of the plurality of gas cartridges is activated independently to release gas into the plenum chamber to control power output of the turbine.

2. The hybrid power system of claim 1, wherein the altitude adjustment flight mode comprises at least one of the following: a hover mode, a transition mode, and an engine failure mode.

3. The hybrid power system of claim 1, wherein the drive system comprises at least one of the following: an electric system, a hydraulic pump system, and a mechanical drive system.

4. The hybrid power system of claim 1, wherein the decomposition gas generator is arranged to use at least one of the following: a liquid decomposition material and a solid decomposition material.

5. The hybrid power system of claim 4, wherein the liquid decomposition material comprises high purity hydrogen peroxide.

6. The hybrid power system of claim 4, wherein the solid decomposition material comprises at least one of sodium azide and nitroguanidine.

7. The hybrid power system of claim 1, wherein at least one of the gas cartridges has contents different from one of the other cartridges in the plurality of gas cartridges.

8. The hybrid power system of claim 1, wherein at least one of the gas cartridges has a size different from one of the other cartridges in the plurality of gas cartridges.

9. A vertical takeoff and landing aircraft comprising:
   a fuselage;
   a wing extending from the fuselage;
   a rotor assembly extending from the wing;
   a drive system coupled to the rotor assembly; and
   a hybrid power system comprising:
      a first power source coupled to the rotor assembly by the drive system and operable to provide a power output for at least a forward flight mode; and
      a second power source coupled to the rotor assembly by the drive system
      comprising:
         a turbine; and
         a decomposition gas generator comprising a plurality of gas cartridges and a plenum chamber disposed between the turbine and the plurality of gas cartridges, the decomposition gas generator is configured such that each of the plurality of gas cartridges is activated independently to release gas into the plenum chamber to control power output of the turbine;
   wherein the hybrid power system is configured such that the second power source is activated to provide additional power during an altitude adjustment flight mode.

10. The aircraft of claim 9, wherein the altitude adjustment flight mode comprises at least one of the following: a hover mode, a transition mode, and an engine failure mode.

11. The aircraft of claim 9, wherein at least one of the gas cartridges has contents different from one of the other cartridges in the plurality of gas cartridges.

12. The aircraft of claim 9, wherein at least one of the gas cartridges has a size different from one of the other cartridges in the plurality of gas cartridges.

13. A method for providing power to a vertical takeoff and landing aircraft comprising:
   providing the aircraft of claim 9;
   powering the rotor assembly using the first power source to provide lift to the aircraft; and
   activating the second power source to power the rotor assembly when the aircraft is in an altitude adjustment flight mode.

* * * * *